(12) United States Patent
Childers et al.

(10) Patent No.: US 9,465,170 B1
(45) Date of Patent: Oct. 11, 2016

(54) UNITARY MULTI-FIBER OPTICAL FERRULE WITH INTEGRATED LENSES

(71) Applicant: US Conec, Ltd., Hickory, NC (US)

(72) Inventors: Darrell R. Childers, Hickory, NC (US); Michael E. Hughes, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 108 days.

(21) Appl. No.: 14/211,480

(22) Filed: Mar. 14, 2014

Related U.S. Application Data

(63) Continuation-in-part of application No. 12/907,644, filed on Oct. 19, 2010.

(60) Provisional application No. 61/789,427, filed on Mar. 15, 2013.

(51) Int. Cl.
*G02B 6/38* (2006.01)
*G02B 1/118* (2015.01)
*G02B 6/40* (2006.01)

(52) U.S. Cl.
CPC ............. *G02B 6/3853* (2013.01); *G02B 1/118* (2013.01); *G02B 6/3831* (2013.01); *G02B 6/403* (2013.01)

(58) Field of Classification Search
CPC ..................................................... G02B 1/118
See application file for complete search history.

(56) References Cited

U.S. PATENT DOCUMENTS

| | | | |
|---|---|---|---|
| 4,421,383 A | 12/1983 | Carlsen | |
| 5,241,612 A * | 8/1993 | Iwama | G02B 6/32 385/59 |
| 5,815,621 A | 9/1998 | Sakai et al. | |
| 6,012,852 A * | 1/2000 | Kadar-Kallen | G02B 6/32 385/74 |
| 6,074,577 A | 6/2000 | Katsura et al. | |
| 6,629,781 B2 | 10/2003 | Shigenaga et al. | |
| 6,719,927 B2 | 4/2004 | Sakurai et al. | |
| 6,739,766 B2 | 5/2004 | Xu et al. | |
| 6,863,452 B2 | 3/2005 | Takada | |
| 7,099,534 B2 * | 8/2006 | Kato | C07K 5/06095 385/129 |
| 7,156,563 B2 | 1/2007 | Morioka | |
| 7,488,124 B2 | 2/2009 | Nakamura | |
| 7,806,601 B2 | 10/2010 | Dean, Jr. et al. | |
| 7,985,026 B1 | 7/2011 | Lin et al. | |
| 8,292,515 B2 | 10/2012 | Liao et al. | |
| 8,366,326 B2 * | 2/2013 | Lin | G02B 6/3885 385/76 |
| 8,454,243 B2 * | 6/2013 | Hsu | G02B 6/32 385/74 |
| 8,491,197 B2 * | 7/2013 | Tamura | G02B 6/4239 385/61 |
| 2003/0113077 A1 * | 6/2003 | Xu | G02B 6/4204 385/93 |
| 2006/0245694 A1 * | 11/2006 | Chen | G02B 6/32 385/71 |
| 2009/0154884 A1 | 6/2009 | Chen et al. | |
| 2012/0120662 A1 * | 5/2012 | Duong | H01L 33/58 362/268 |
| 2015/0219863 A1 * | 8/2015 | Haase | G02B 6/3883 385/60 |

* cited by examiner

*Primary Examiner* — Daniel Petkovsek
(74) *Attorney, Agent, or Firm* — Michael L. Leetzow, P.A.

(57) ABSTRACT

A unitary multi-fiber ferrule has micro-holes for optical fibers, and a plurality of lenses disposed adjacent the front end, each of the plurality of lenses optically aligned with one of the micro-holes and exposed to air. Multiple rows of optical fibers and lenses may also be used in the unitary multi-fiber ferrule. The lenses have a divergence half angle of between about 2 and 20 degrees and may also have protrusions on them acting as an antireflective coating.

9 Claims, 14 Drawing Sheets

UNITARY MULTI-FIBER OPTICAL FERRULE WITH INTEGRATED LENSES

REFERENCE TO RELATED CASE

This application is a continuation in part of application Ser. No. 12/907,644 filed Oct. 19, 2010, and also claims priority under 35 U.S.C. §119 (e) to provisional application No. 61/789,427 filed on Mar. 15, 2013, the contents of both applications are hereby incorporated by reference in their entirety.

BACKGROUND OF THE INVENTION

Field of the Invention

Typically, optical fibers inserted in optical ferrules, particularly MT ferrules, need a significant amount of processing for the optical ferrules to be able to efficiently transmit the light through the optical fibers and across a fiber optic junction. Optical fibers are inserted into the ferrules and then epoxy is injected into the ferrules to secure the fibers in the ferrules. The ferrules are then placed in curing oven for about 30 minutes to cure the epoxy. After the epoxy is cured, the ferrules are polished and cleaned at least four times using a fiber optic polishing machine. The visual quality of the optical fiber end face is examined and the ferrules are re-polished if there are significant scratches or pits. The end face geometry is also usually measured with an interferometer and re-polished if there are issues with the end face quality. Lastly, an optical test is completed. This process requires a significant capital outlay for the equipment as well as significant time and operator intervention to achieve a quality product.

Additionally, the integrated lenses have a divergence half angle θ that is between about 2 and 20 degrees. Most preferably, the divergence half angle θ is about 5 degrees. With this divergence half angle, the size of the light spot from the ferrule expands from 0.18 mm to more than 4.5 mm at a position 25 mm away from the ferrule when put into service. This greatly reduces the intensity of the light emitted from the ferrule at that distance and reduces the potential damage done to a person's eye working around the ferrules, making this a safety feature of the ferrules.

The lenses may also have increased losses as a result of using the integrated lenses. The losses are due to reflection of the light of the curved surfaces. Using a plurality of protrusions molded onto the surfaces of the lenses, reduces the reflections and the losses associated therewith. The protrusions preferably do not have a dimension that is the same as or greater than the wavelength of the light passing through the lenses.

While providing an excellent fiber optic connector, a cheaper optical ferrule that can be more efficiently assembled without the expensive equipment is needed.

SUMMARY OF THE INVENTION

The present invention is directed to a unitary multi-fiber optical ferrule that has rounded holes in the body of the ferrule to accept and guide the optical fibers and integrated lenses that can either collimate or focus the light for optical communication with another optical ferrule, the lenses having a particular divergence half angle.

According to one aspect of the present invention, a unitary fiber optic ferrule includes a unitary main body having a front end, a back end, and a middle portion disposed between the front end and back end, a first opening adjacent the back end of the unitary main body, the first opening configured to receive at least two optical fibers, a plurality of optical fiber openings extending from the first opening toward the front end, each of the plurality of optical fiber openings configured to receive an optical fiber, and a plurality of lenses disposed adjacent the front end, each of the plurality of lenses being in optical alignment with a respective one of the optical fiber openings, the plurality of lenses having at least one surface exposed to air and each of the plurality of lenses having a divergence half angle of between about 2 and 20 degrees.

In yet another aspect, a unitary fiber optic ferrule includes a unitary main body having a front end, a back end, and a middle portion disposed between the front end and back end, a first opening adjacent the back end of the unitary main body, the first opening configured to receive at least two optical fibers, a plurality of optical fiber openings extending from the first opening toward the front end, each of the plurality of optical fiber openings configured to receive an optical fiber, and a plurality of lenses disposed adjacent the front end, each of the plurality of lenses being in optical alignment with a respective one of the optical fiber openings, the plurality of lenses having at least one surface exposed to air and having a plurality of protrusions, each of the protrusions having dimensions smaller than wavelengths of light passing through the unitary fiber optic ferrule.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE PREFERRED EMBODIMENTS

Figure 1:
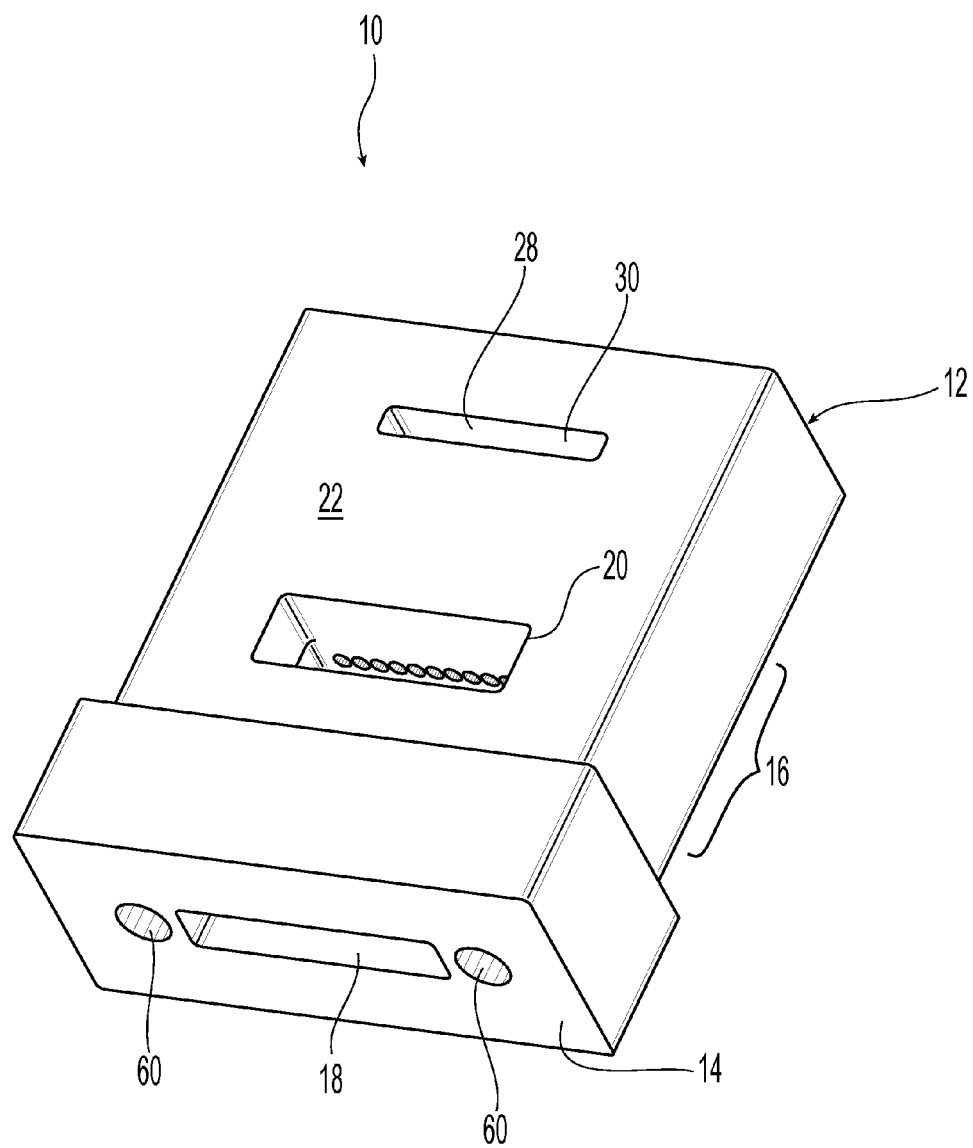
FIG. 1 is a top perspective view of one embodiment of a unitary multi-fiber optical ferrule with integrated lenses according to the present invention.
Figure 2:
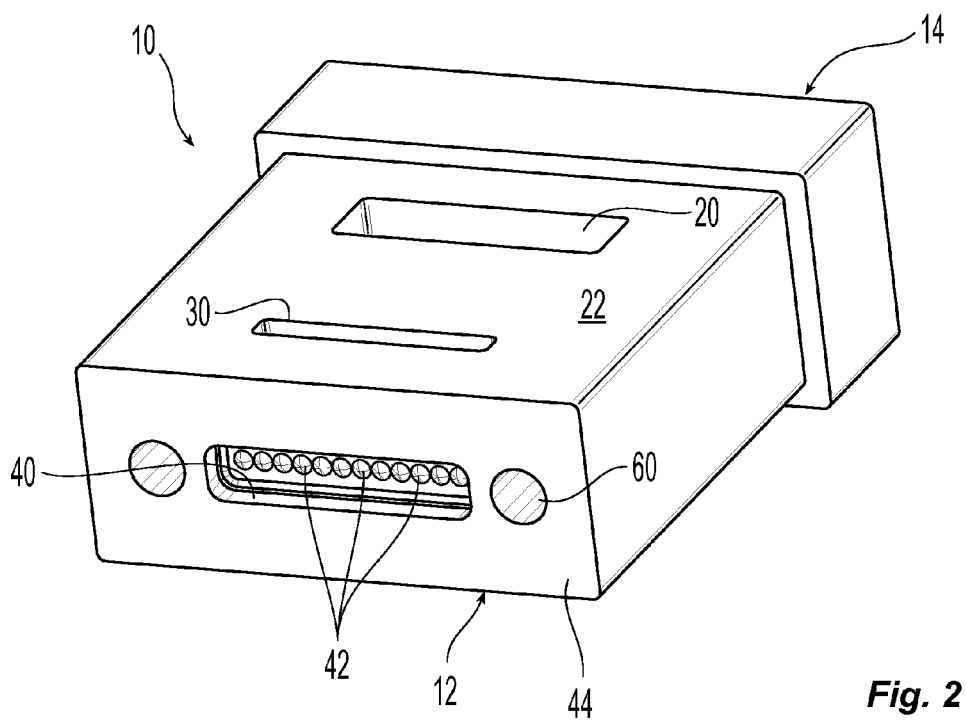
FIG. 2 is a front perspective view of the unitary multi-fiber optical ferrule with integrated lenses of FIG. 1.
Figure 3:
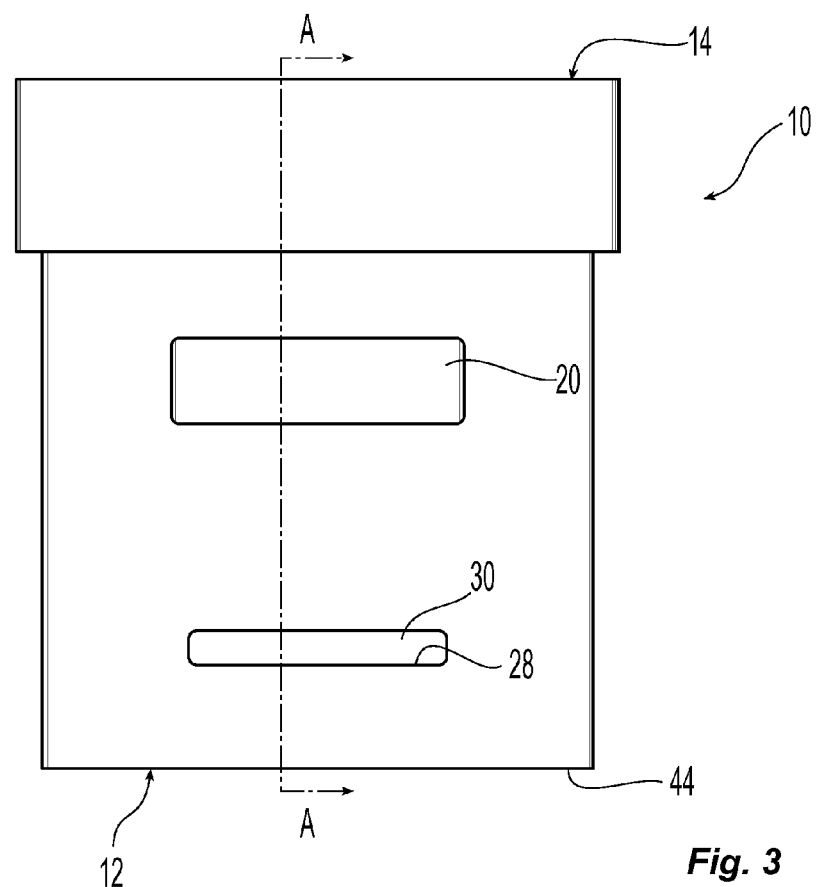
FIG. 3 is a top view of the unitary multi-fiber optical ferrule with integrated lenses of FIG. 1.
Figure 4:
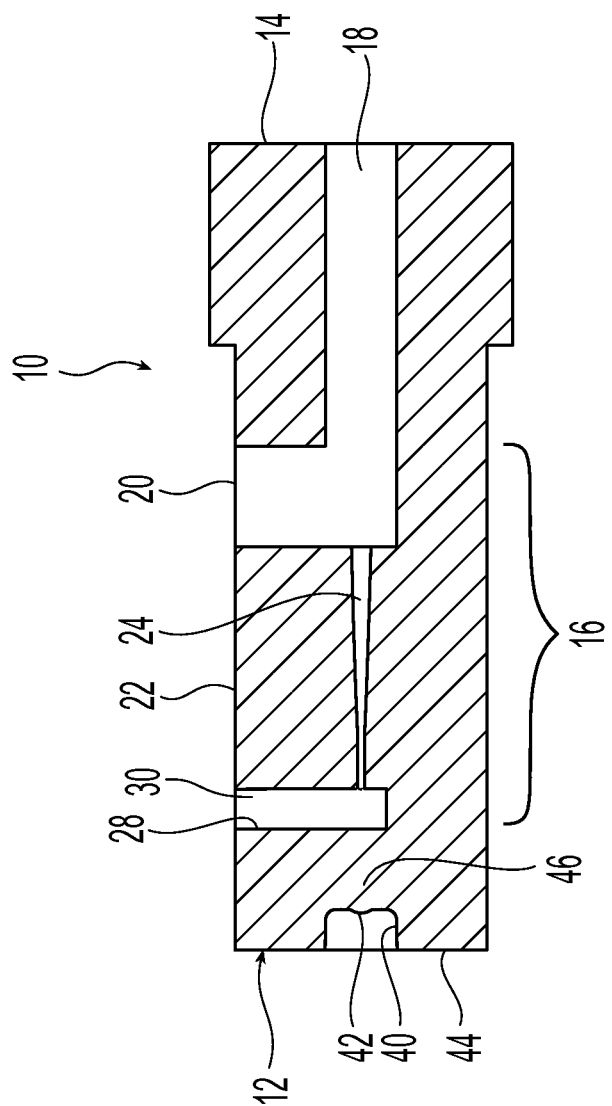
FIG. 4 is a cross-sectional view of the unitary multi-fiber optical ferrule with integrated lenses along the line A-A of FIG. 3.
Figure 5:
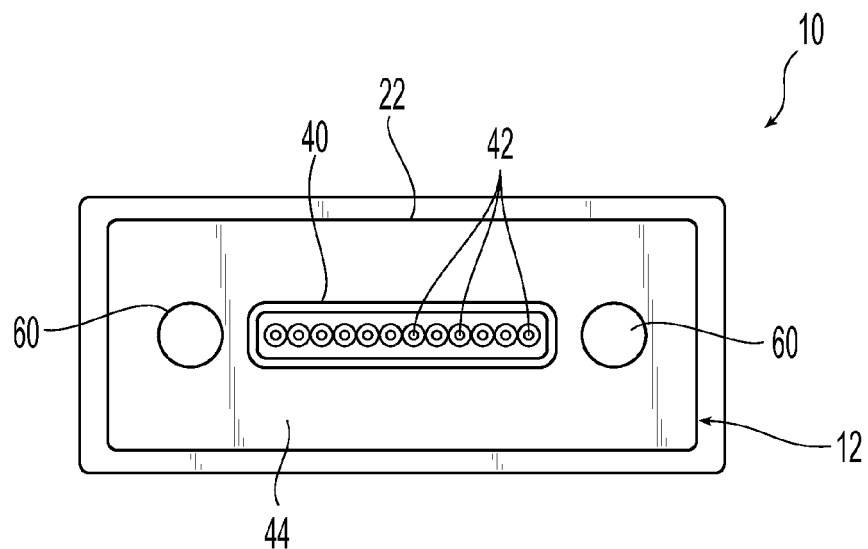
FIG. 5 is a front elevational view of the unitary multi-fiber optical ferrule with integrated lenses of FIG. 1.
Figure 6:
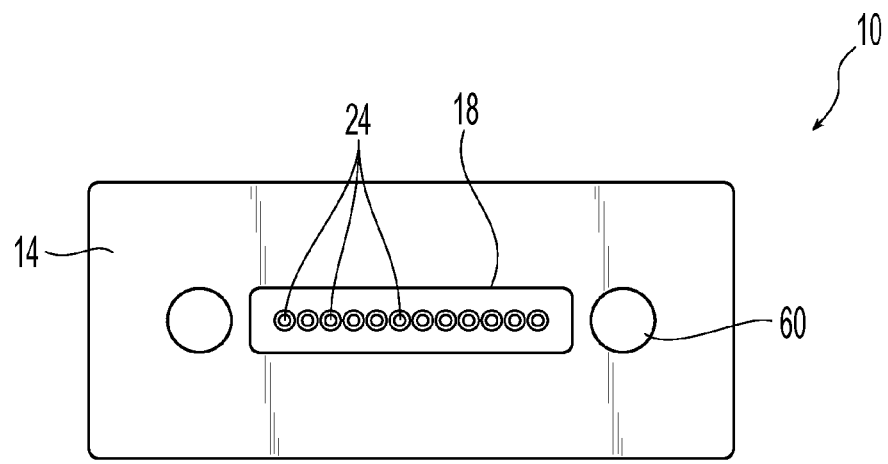
FIG. 6 is a rear elevational view of the unitary multi-fiber optical ferrule with integrated lenses of FIG. 1.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a unitary multi-fiber optical ferrule with integrated lenses 10 (optical ferrule) according to the present invention is illustrated. The optical ferrule 10 preferably has an front end 12, a back end 14, and a middle portion 16 disposed between the front end 12 and the back end 14. The optical ferrule 10 is a unitary ferrule, that is, a single integral element that is preferably molded at the same time from a homogeneous material. The optical ferrule 10 is an optically clear polymer, which may include polyetherimide, polycarbonate, cyclic olefin copolymer, cyclic olefin polymer, or other transparent polymers. The optical ferrule 10 has a first opening 18 adjacent the back end 14 to receive optical fibers therein. The optical ferrule 10 may also have an opening 20 from the top surface 22 of the optical ferrule 10 that is in communication with the first opening 18 to inject epoxy to secure optical fibers within the optical ferrule 10 as described in more detail below. A plurality of micro-holes 24 extend through the middle portion 16 to hold and position optical fibers inserted into the first opening 18. The micro-holes 24 are preferably tapered, being larger adjacent the first opening 18 than at the opposite end. A fiber stop plane 28 is disposed across an opening 30 from the plurality of micro-holes 24. Preferably, the opening 30 opens to one of the sides of the optical ferrule 10, which is the top side 22 in this embodiment of optical ferrule 10. Epoxy may also be injected into the opening 30 to further secure the optical fibers in the optical ferrule 10. Preferably, the epoxy used in the opening 30 and the first opening 18 is an index-matched epoxy that is also preferably light curable. The fiber stop plane 28 is positioned to be a reference plane for the ends of the optical fibers that extend from the first opening 18 through the plurality of micro-holes 24 and across opening 30.

The front end 12 has a recessed portion 40 with a plurality of lenses 42 visible therein. The plurality of lenses 42 are preferably set back from the front face 44 of the front end 12 and are precisely positioned to be in optical alignment with the plurality of micro-holes 24 (and the optical fibers inserted therein). Preferably, the number of lenses 42 corresponds to and are in individual alignment with the number and position of the micro-holes 24. The plurality of lenses 42 are molded with the rest of the optical ferrule 10 and are generally a collimating-type lens. That is, the lenses 42, because they are in contact with air in the recessed portion 40, are collimating due to the difference in the index of refraction between the polymer and the air and the shape of the lens. The light exiting from the optical fibers inserted into the optical ferrule 10 passes through the portion 46 of the optical ferrule 10 between the fiber stop plane 28 and the lenses 42 and is then collimated into a near-parallel light beam to be received by lenses of an identical, mated optical ferrule, which then focus the received light onto the ends of the optical fibers in that ferrule. It is anticipated that the front end 12 of the optical ferrule 10 makes physical contact with the other optical ferrule using the front faces 44. With the front faces 44 of two opposing optical ferrules 10 making physical contact, the recessed portion 40 of each of the optical ferrules 10 are sealed off from the environment and prevents dust, oil, moisture, or other contaminants from being deposited on the lenses and affecting the properties of the lenses 42. Thus, the optical ferrule 10 is designed for ferrule-to-ferrule contact rather than for fiber-to-fiber contact as with MT ferrules.

Figure 7:
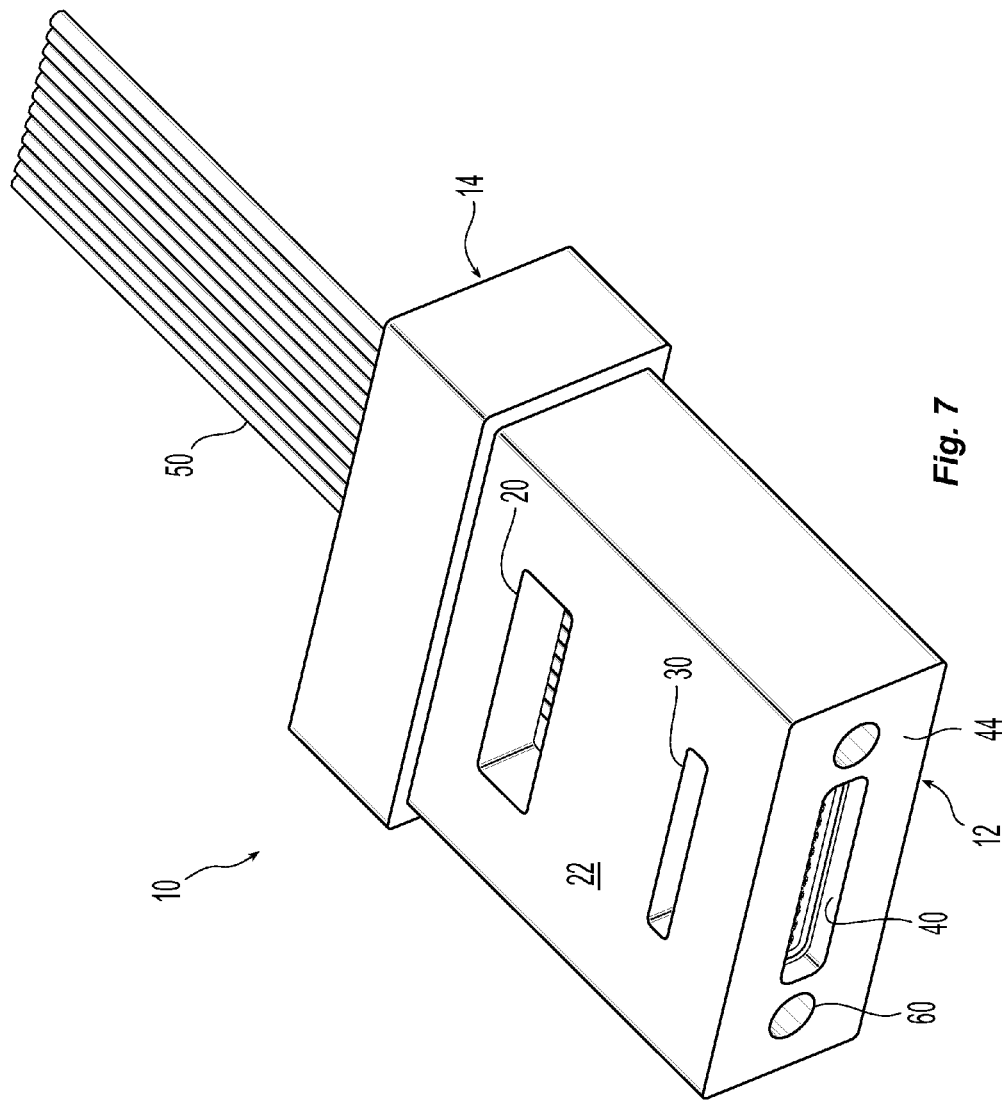
FIG. 7 is a perspective view of the unitary multi-fiber optical ferrule with integrated lenses of FIG. 1 with optical fibers in a ribbon configuration inserted therein.

The optical ferrule 10 may use loose optical fibers that are inserted into the micro-holes 24 or, as illustrated in FIG. 7, the optical fibers may be in the form of an optical ribbon 50. Similarly, loose optical fibers may be bundled rather than be ribbonized before being inserted into the optical ferrule 10.

Referring back to FIGS. 1-6, the optical ferrule 10 also has guide pin openings 60 that extend from the front end 12 to the back end 14. Guide pins as are known in the prior art may be used to align the optical ferrules 10 with one another. It should be noted that while the position and apparent size of the guide pin openings 60 are standard for the industry, the size, location, and/or pitch of the guide pin openings 60 may be altered to prevent the optical ferrule 10 from being mated to a standard ferrule, such as an MT ferrule.

Figure 8:
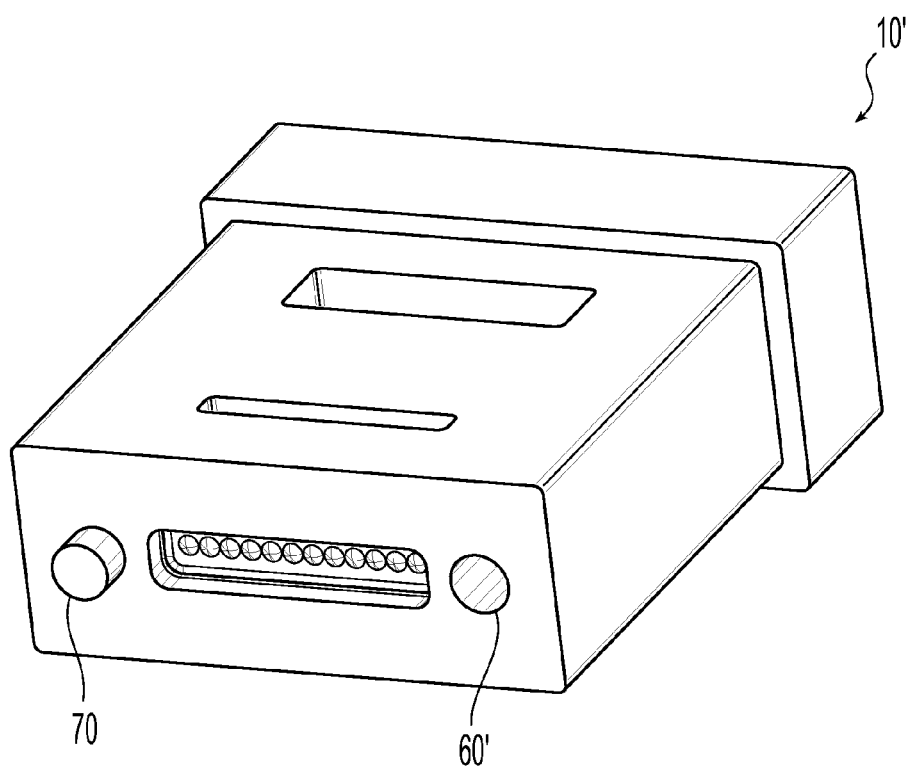
FIG. 8 is a front perspective view of another embodiment of a unitary multi-fiber optical ferrule with integrated lenses according to the present invention.

It is also possible, as is illustrated in FIG. 8 in an alternative embodiment of unitary multi-fiber optical ferrule with integrated lenses 10', that a molded guide pin 70 and a guide pin opening 60' may be used rather than two guide pin openings. By using one integrated, molded guide pin 70 and a guide pin opening 60', making it a hermaphroditic ferrule, only one hermaphroditic ferrule type needs to be manufactured and still allow for mating with the other hermaphroditic ferrules. By using a hermaphroditic ferrule, fiber optic connectors using the optical ferrules 10' are mated key-up to key-up instead of the typical key-up to key-down configuration. By molding the guide pin 70, fewer parts are needed in the assembly, since there is no need for the female pin clamp, the male pin clamp, or the metal guide pins that are commonly used in other optical ferrule formats.

Figure 9:
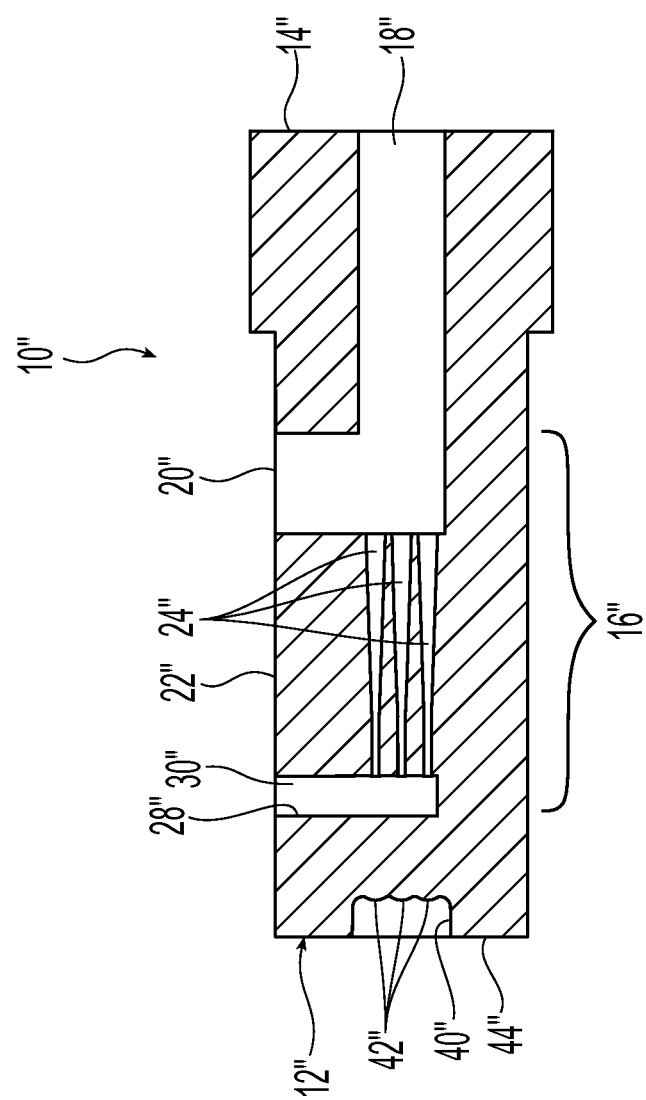
FIG. 9 is a cross-sectional view of another embodiment of a unitary multi-fiber optical ferrule with integrated lenses according to the present invention.
Figure 10:
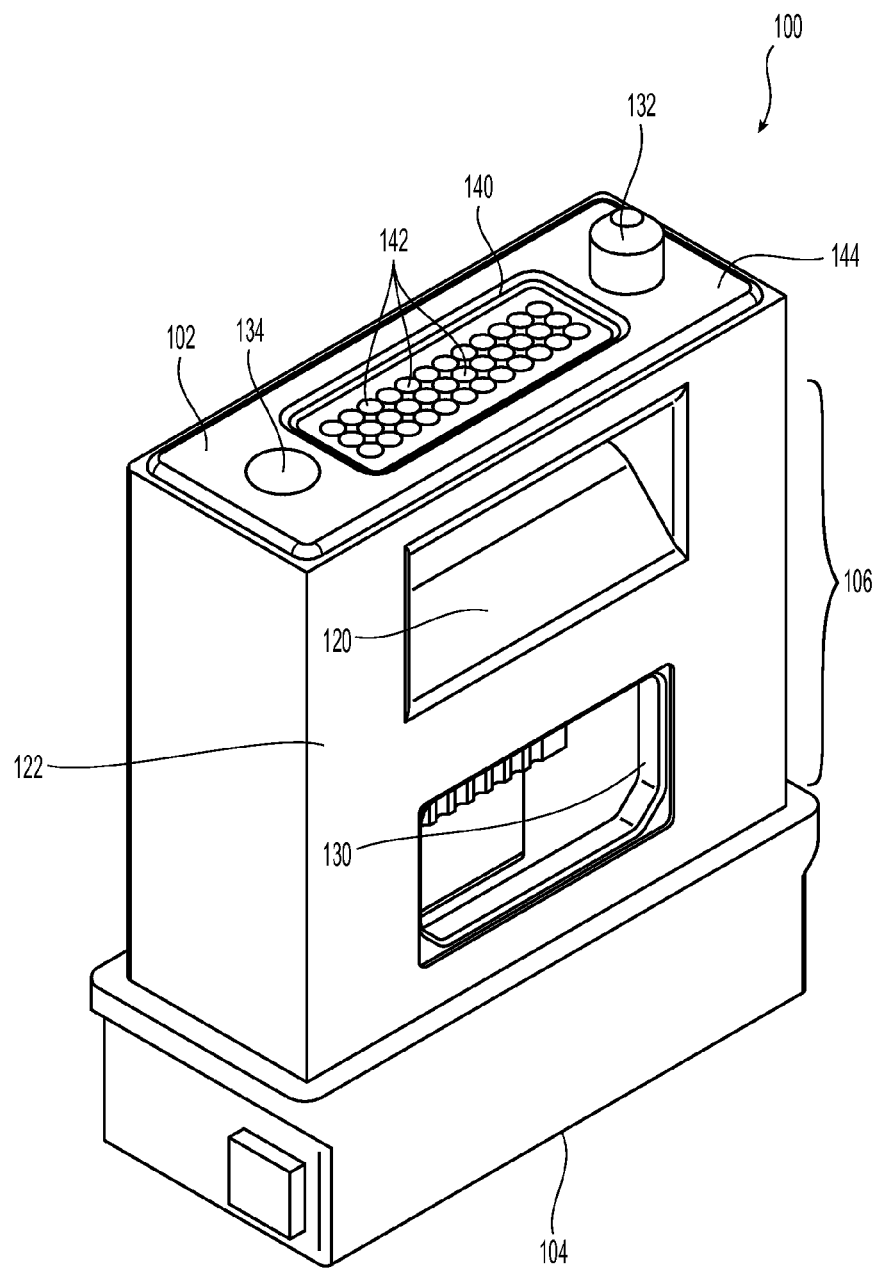
FIG. 10 is a top perspective view of another embodiment of a unitary multi-fiber optical ferrule with integrated lenses according to the present invention.
Figure 11:
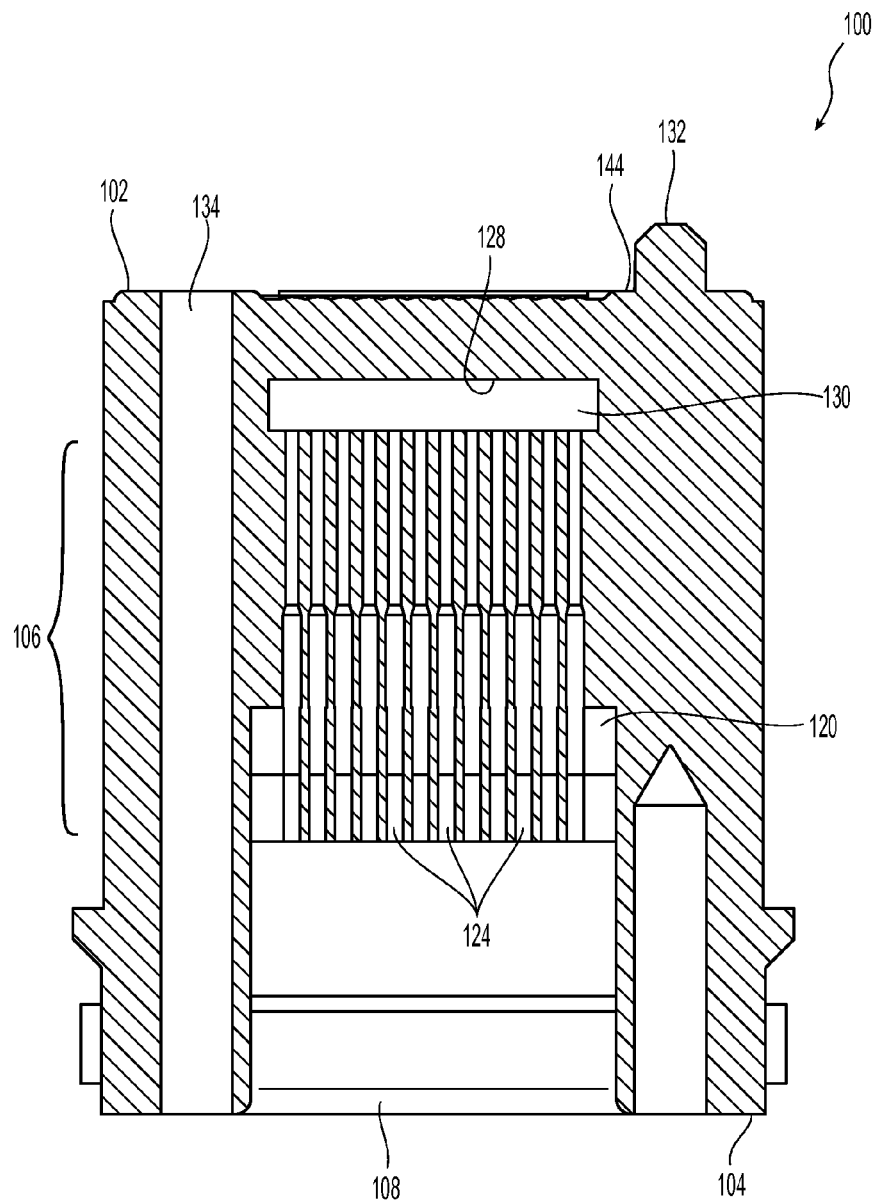
FIG. 11 is a cross-sectional view of the unitary multi-fiber optical ferrule with integrated lenses of FIG. 10.
Figure 12:
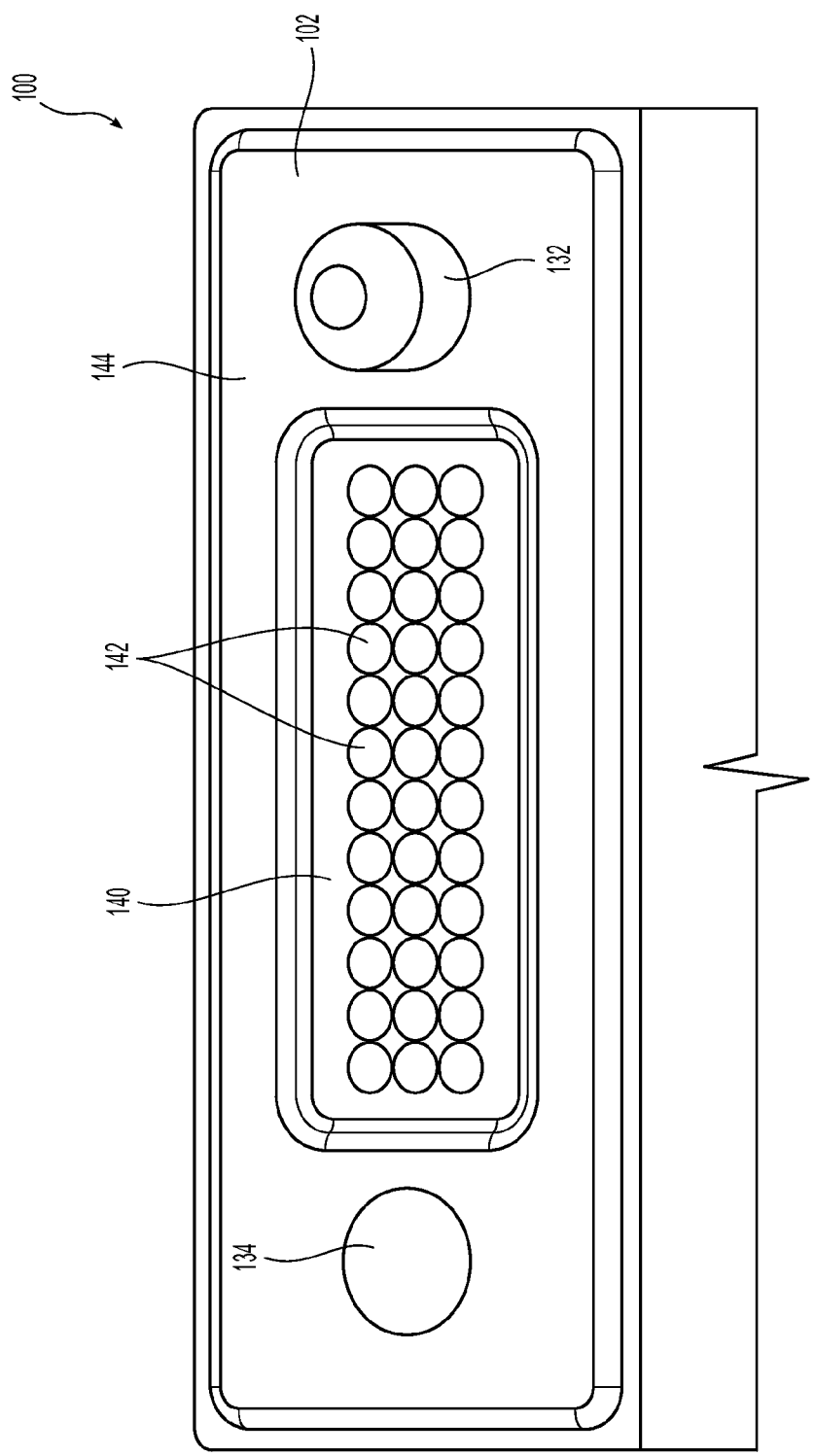
FIG. 12 is an enlarged perspective view of the end face of the multi-fiber optical ferrule of FIG. 10.
Figure 13:
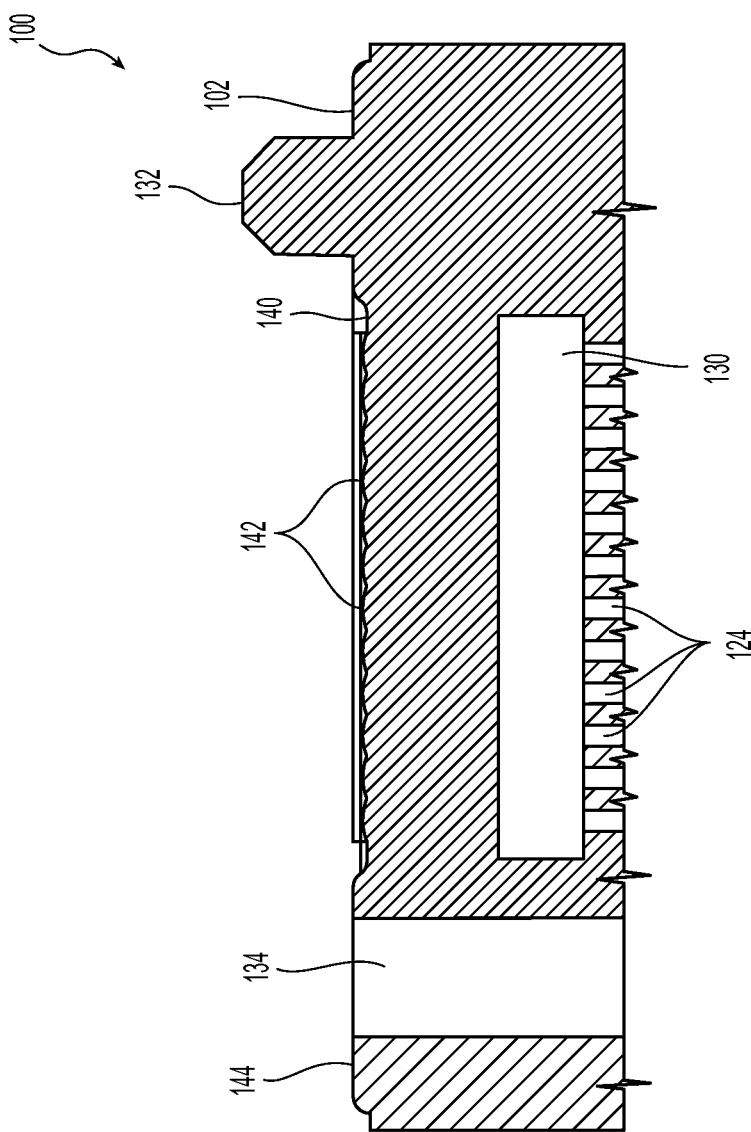
FIG. 13 is an enlarged view of a cross section at the front end of the multi-fiber optical ferrule of FIG. 10.

Another alternative embodiment of an unitary multi-fiber optical ferrule with integrated lenses 10" is illustrated in FIG. 9. The optical ferrule 10" preferably has an front end 12", a back end 14", and a middle portion 16" disposed between the front end 12" and the back end 14". The optical ferrule 10" also has a first opening 18" adjacent the back end 14" to receive optical fibers therein. The optical ferrule 10" may also have an opening 20" from the top surface 22" of the optical ferrule 10" that is in communication with the first opening 18" to inject epoxy to secure optical fibers within the optical ferrule 10". The front end 12" has a recessed portion 40" with a plurality of lenses 42". The optical ferrule 10" has a plurality of micro-holes 24", the plurality of micro-holes 24" being divided into a plurality of rows, and a corresponding plurality of lenses 42", the plurality of lenses 42" are divided into a plurality of rows. As noted above, each of the micro-holes 24" being aligned with a respective lens 42". The number of rows of micro-holes 24" and lenses 42" may be determined based on need and application. A fiber stop plane 28" is disposed across an opening 30" from the plurality of micro-holes 24". Preferably, the opening 30 opens to one of the sides of the optical ferrule 10, which is the top side 22" in this embodiment of optical ferrule 10". As illustrated in FIG. 9, three rows of micro-holes 24" and lenses 42" are present for a 36 fiber ferrule.

While the lenses 42 (and 42") have been described as being collimating lenses, they may also be focusing lenses so that the optical ferrules (10, 10', and 10") may be used with a different form of optical ferrule, e.g., a standard MT ferrule. In this case, the lenses 42 (and 42") would focus the light to a point that would correspond to the end of the optical fibers in the other optical ferrules.

The process for inserting optical fibers, such as those in the fiber optic ribbon 50, into the optical ferrules (10, 10', and 10") is as follows. The optical fibers are stripped bare and cleaned. The ends of the optical fibers are cleaved and then inserted into the optical ferrule through the first opening 18 and into the micro-holes 24. The optical fibers are pushed through the micro-holes 24 until they reach the fiber stop plane 28 across the opening 30. An index-matched epoxy is inserted into the openings 20 and 30 to secure the optical fibers in the optical ferrule. The epoxy is light cured (UV and near-UV), which is usually less than one minute in duration. Alternatively, a heat cured epoxy could be used to secure the optical fibers in the ferrule. Then an optical test is performed to ensure optical performance. This procedure requires fewer steps and less equipment given that the ends of the optical fibers do not extend through the end face of the optical ferrule as in the MT ferrule discussed above. Additionally, there is no polishing of the end face as noted above for the MT ferrule and time can be reduced using a light-curable epoxy.

Another embodiment of a unitary multi-fiber optical ferrule with integrated lenses 100 (optical ferrule) according to the present invention is illustrated in FIGS. 10-13. The optical ferrule 100 preferably has an front end 102, a back end 104, and a middle portion 106 disposed between the front end 102 and the back end 104. The optical ferrule 100 is a unitary ferrule, that is, a single integral element that is preferably molded at the same time from a homogeneous material. The optical ferrule 100 is an optically clear polymer, which may include polyetherimide, polycarbonate, cyclic olefin copolymer, cyclic olefin polymer, or other transparent polymers. The optical ferrule 100 has a first opening 108 adjacent the back end 104 to receive optical fibers therein. The optical ferrule 100 may also have an opening 120 from the top surface 122 of the optical ferrule 100 that is in communication with the first opening 108 to inject epoxy to secure optical fibers within the optical ferrule 100 as described in more detail below. A plurality of micro-holes 124 extend through the middle portion 106 to hold and position optical fibers inserted into the first opening 108. The micro-holes 124 are preferably tapered, being larger adjacent the first opening 108 than at the opposite end. A fiber stop plane 128 is disposed across an opening 130 from the plurality of micro-holes 124. Preferably, the opening 130 opens to one of the sides of the optical ferrule 100, which is the top surface 122 in this embodiment of optical ferrule 100. Epoxy may also be injected into the opening 130 to further secure the optical fibers in the optical ferrule 100. Preferably, the epoxy used in the opening 130 and the first opening 108 is an index-matched epoxy that is also preferably light curable. The fiber stop plane 128 is positioned to be a reference plane for the ends of the optical fibers that extend from the first opening 108 through the plurality of micro-holes 124 and across opening 130. However, the optical fibers may be positioned in other ways as well.

The front end 102 also has an integral guide pin 132 on one side thereof and a guide pin opening 134 on the opposite side. As will be recognized by one of ordinary skill in the art, the optical ferrule 100 may have two integral guide pins 132 or two guide pin openings 134. The front end 102 also has a recessed portion 140 with a plurality of lenses 142 visible therein. The plurality of lenses 142 are preferably set back from the front face 144 of the front end 102 and are precisely positioned to be in optical alignment with the plurality of micro-holes 124 (and the optical fibers inserted therein). Preferably, the number of lenses 142 corresponds to and are in individual alignment with the number and position of the micro-holes 124. The plurality of lenses 142 are molded with the rest of the optical ferrule 100. Moreover, the lenses 142 have a forward most portion or apex that is preferably between 50 and 200 microns from the front end 102. Most preferably, the lenses 142 are only 50 microns from the front end 102 and the front face 144 in particular. The optical ferrule 100 is cleaned using a tool with a soft pile cloth to avoid scratching the lenses 142. If the lenses 142 are too deep, the tool may not be able to reach the lenses 142 to clean them. If the lenses 142 are too close to the front end 102, then they may get scratched. These distances allow for the same tool to be used to clean several different sized recessed portions 140.

Figure 15:
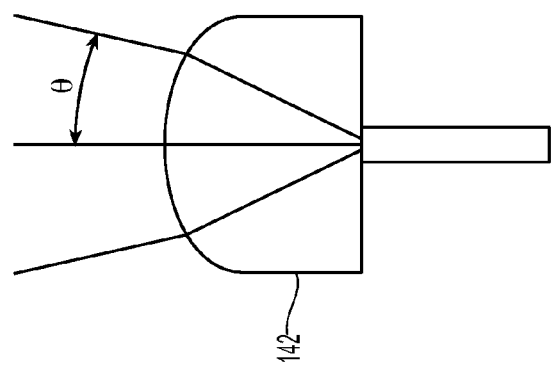
Figure 14:
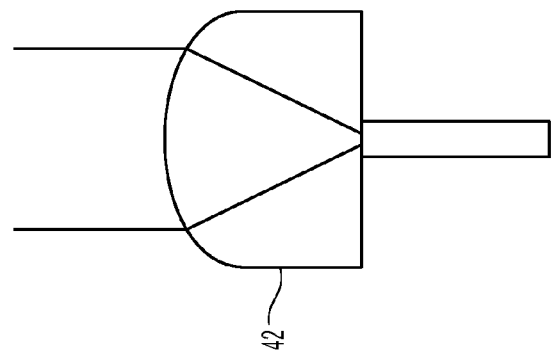

The shape of the lenses 142 are different from the shape of the lenses in the other embodiments. As noted above, the lenses 42 are shaped such that the light coming through the lens 42 is generally collimated. This is illustrated in FIG. 14. However, if the optical ferrule 10, 100 is not mated with another optical ferrule, the light exiting the lens is small enough and concentrated enough to damage a person's retina. The reason that the light has typically been collimated is because the distances between the opposite ferrules is not so important if the light is collimated. In addition, for the case where the mated ferrules have the same lens design, the optimum insertion loss is achieved with a collimated beam. However, due to the possibility of causing injury or damage to a person's eye, something has to be done to reduce the intensity of the light, which then has an effect on the distances between the two lenses/ferrules. Shutters and other methods and apparatus are known to block the light. However, in many instances, these solutions are not optimal or practical. Therefore, if the light exiting the lenses on the ferrule can be diverging, it is possible to reduce the intensity. Thus, as illustrated in FIG. 15, the lenses 142 are diverging lenses that have a divergence half angle $\theta$. Preferably, the divergence half angle $\theta$ is between about 2 and 20 degrees. More preferably, the divergence half angle $\theta$ is not less than two degrees and most preferably about 5 degrees. Taking this into account, if the ferrule (and its connector) is in an adapter, the closest a person's eye could be to the ferrule and lens is about 25 mm. If the light comes out of a lens with a divergence half angle $\theta$ of 5 degrees, then the size of the light spot expands from 0.18 mm to more than 4.5 mm at the 25 mm position. This greatly reduces the intensity of the light and reduces the potential damage done to a person's eye.

Figure 16:
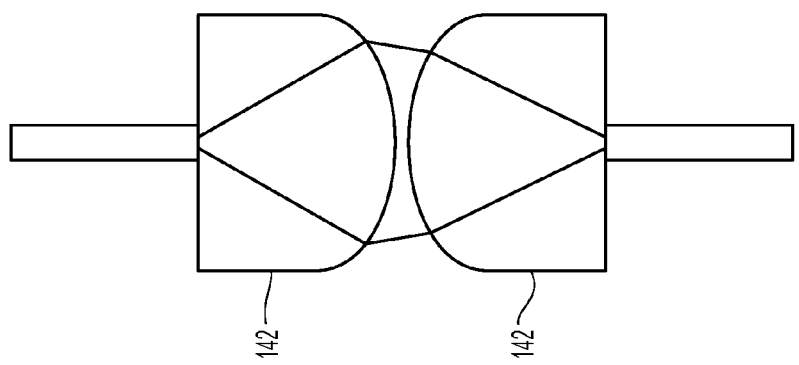
FIGS. 14-16 are schematic representations of light passing through lenses of a fiber optic ferrule.

FIG. 16 shows that the lens on a mated ferrule will re-converge the light to focus it on the optical fiber. If the divergence half angle $\theta$ is larger than 5 degrees, then the mated ferrule would have to have a different curvature to refocus the light, or the losses would be extremely high.

Figure 17:
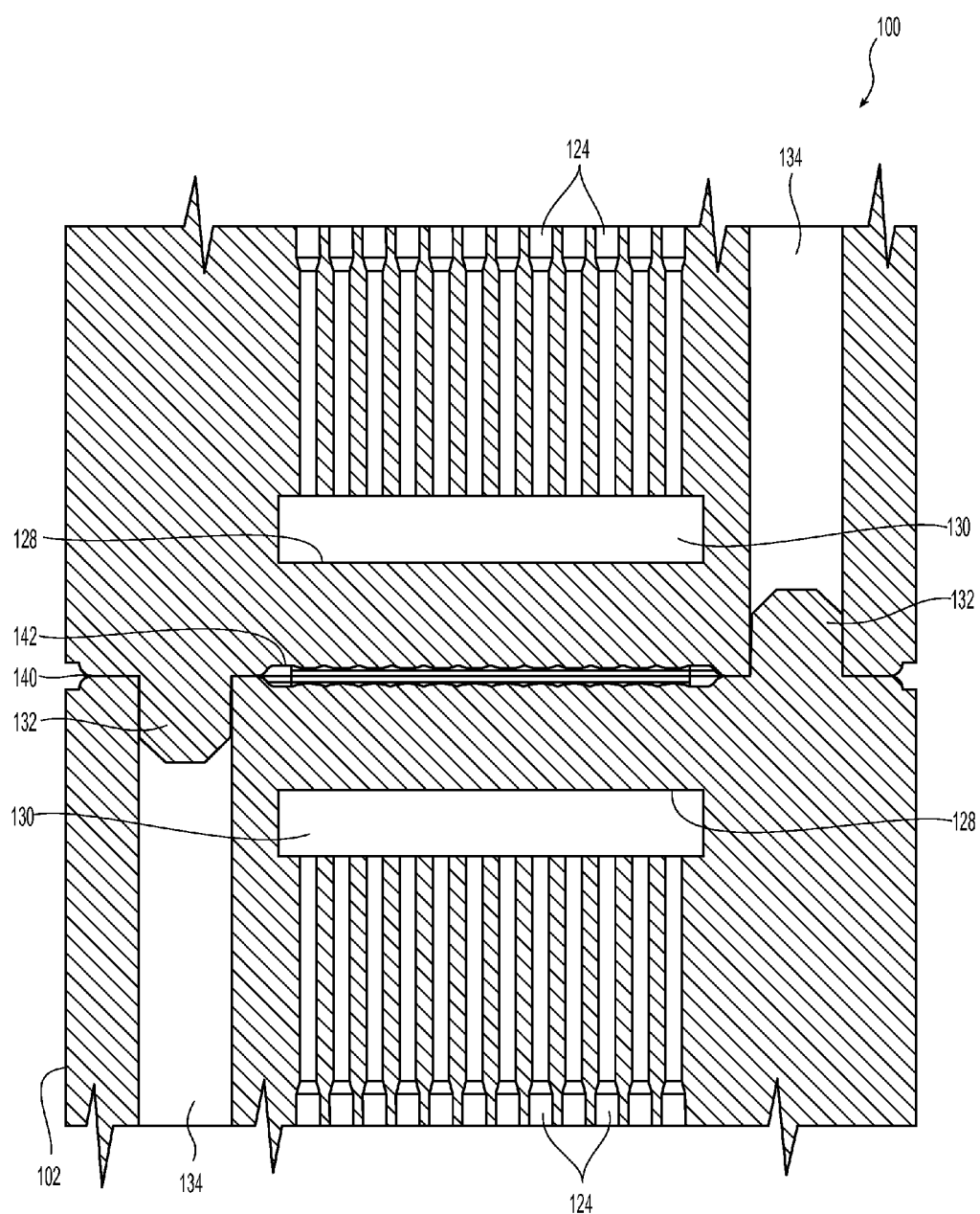
FIG. 17 is an enlarged view of two multi-fiber optical ferrules of FIG. 10 engaged with one another.

FIG. 17 illustrates two optical ferrules 100 that are mated to one another. The front ends 102 and particularly the front faces 144 of the optical ferrules 100 are in contact with one another. This keeps dust and debris out of the recessed portion 140 and off the lenses 142. With the lenses 50 microns from the front faces 144 of the optical ferrule 100, the distance between the lenses is only 100 microns and the divergence is not too great and cause a loss of signal across the gap between the ferrules.

Figure 18:
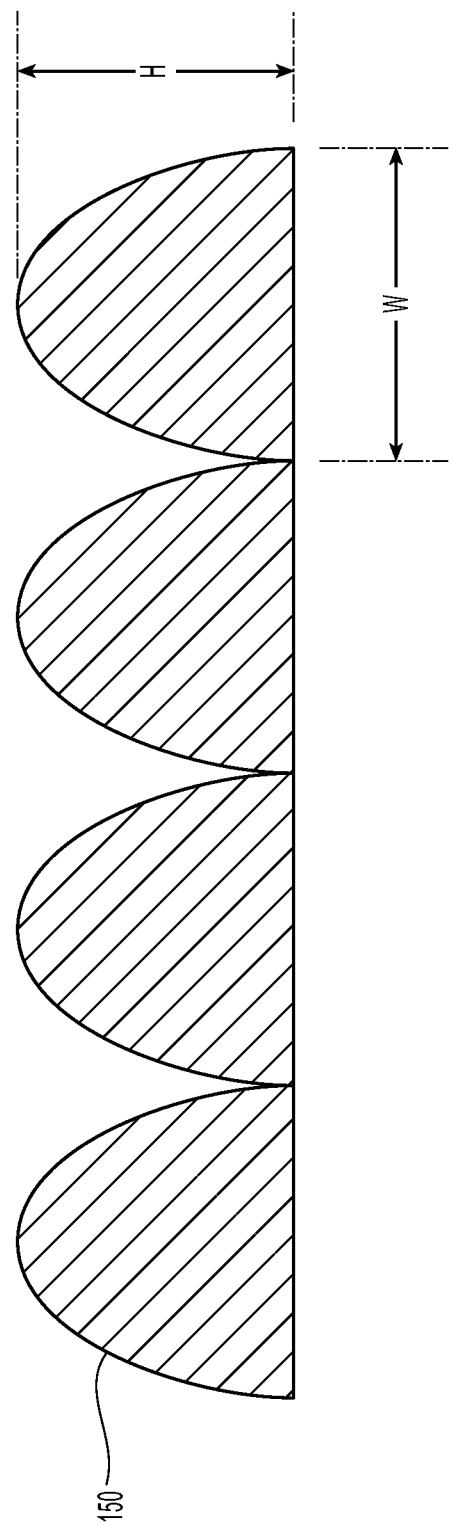
FIG. 18 is a cross-section of a representative sample of the protrusions on lenses of the multi-fiber optical ferrule.

Another issue with the lenses 142 in the optical ferrules 100 is that it causes reflections of the light and increase loss. One way to reduce the reflections and the attendant losses is to apply an anti-reflective coating to the lenses. Anti-reflective coatings are expensive and hard to apply, especially to such small surfaces. They are also prone to scratching, particularly with the cleaning necessary for the end faces. They also must pass environmental testing without flaking and peeling. An alternative is to mold protrusions 150 onto the exterior surface of the plurality of lenses 142. See FIG. 18. If the protrusions are smaller in all directions than the wavelength of the light passing through them, then the protrusions 150 generally act like an anti-reflective coating. It has been discovered that if the height H and the width W of the protrusions 150 are smaller than 350 nm in any one direction for use with the lenses 142, the lenses work well. While the 350 nm dimensions are designed for white light, it does work well with the 850 nm light used most often with the optical ferrules. As the wavelengths of the light used can be 1310 or 1550 nm, the dimensions of the protrusions 150 may also get larger.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A unitary fiber optic ferrule comprising:
   a unitary main body having a front end, a back end, and a middle portion disposed between the front end and back end;
   a first opening adjacent the back end of the unitary main body, the first opening configured to receive at least two optical fibers;
   a plurality of optical fiber openings extending from the first opening toward the front end, each of the plurality of optical fiber openings configured to receive an optical fiber; and
   a plurality of lenses disposed adjacent the front end, each of the plurality of lenses being in optical alignment with a respective one of the optical fiber openings, the plurality of lenses having at least one surface exposed to air and each of the plurality of lenses having a divergence half angle of between about 2 and 20 degrees.

2. The unitary fiber optic ferrule according to claim 1, wherein the divergence half angle is larger than 2 degrees.

3. The unitary fiber optic ferrule according to claim 1, wherein the divergence half angle is about 5 degrees.

4. The unitary fiber optic ferrule according to claim 3, wherein the plurality of lenses have an apex and the apex of each of the plurality of lenses is between 50 and 200 microns from the front end of the unitary main body.

5. The unitary fiber optic ferrule according to claim 4, wherein the apex of each of the plurality of lenses is about 50 microns from the front end of the unitary main body.

6. The unitary fiber optic ferrule according to claim 1, further comprising a recessed portion directly adjacent the front end, the plurality of lenses disposed in the recessed portion.

7. A unitary fiber optic ferrule comprising:
   a unitary main body having a front end, a back end, and a middle portion disposed between the front end and back end;
   a first opening adjacent the back end of the unitary main body, the first opening configured to receive at least 12 optical fibers;
   a plurality of optical fiber openings extending from the first opening toward the front end, each of the plurality of optical fiber openings configured to receive an optical fiber, the plurality of optical fiber openings comprising at least two rows; and
   a plurality of lenses disposed adjacent the front end and in at least two rows, each of the plurality of lenses being in optical alignment with a respective one of the optical fiber openings, the plurality of lenses having at least one surface exposed to air and each of the plurality of lenses having a divergence half angle of between about 2 and 20 degrees.

8. The unitary fiber optic ferrule according to claim 7, wherein each of the at least two rows of optical fiber openings and the plurality of lenses comprise three rows.

9. A unitary fiber optic ferrule comprising:
   a unitary main body having a front end, a back end, and a middle portion disposed between the front end and back end, the front end terminating at a front face;
   a first opening adjacent the back end of the unitary main body, the first opening configured to receive at least two optical fibers;
   a plurality of optical fiber openings extending from the first opening toward the front end, each of the plurality of optical fiber openings configured to receive an optical fiber; and
   a plurality of lenses disposed adjacent the front end, each of the plurality of lenses being in optical alignment with a respective one of the optical fiber openings, the plurality of lenses having at least one surface exposed to air, the plurality of lenses have a divergence half angle of between about 2 and 20 degrees and are disposed within a recessed portion directly adjacent the front end and the front end circumscribing the recessed portion.

* * * * *